United States Patent
Casati et al.

(10) Patent No.: US 7,505,967 B2
(45) Date of Patent: Mar. 17, 2009

(54) DISPLAYING METRICS FROM AN ALTERNATIVE REPRESENTATION OF A DATABASE

(75) Inventors: Fabio Casati, Palo Alto, CA (US); Ming-Chien Shan, Saratoga, CA (US); Umeshwar Dayal, Saratoga, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 786 days.

(21) Appl. No.: 10/761,642

(22) Filed: Jan. 21, 2004

(65) Prior Publication Data

US 2005/0160081 A1     Jul. 21, 2005

(51) Int. Cl.
*G06F 17/30*     (2006.01)

(52) U.S. Cl. .......................... 707/4; 707/100

(58) Field of Classification Search ............. 707/1–5, 707/10, 100–102, 104.1
See application file for complete search history.

(56) References Cited

U.S. PATENT DOCUMENTS

| 6,732,086 B2* | 5/2004 | Plow et al. ............... 707/3 |
| 2003/0041044 A1 | 2/2003 | Monestere, III |
| 2003/0115149 A1* | 6/2003 | Dan et al. ............... 705/64 |
| 2003/0126114 A1* | 7/2003 | Tedesco ................. 707/3 |
| 2005/0256766 A1* | 11/2005 | Garcia et al. ............ 705/14 |

* cited by examiner

*Primary Examiner*—Cheryl Lewis (57) ABSTRACT

A system and method comprises selecting at least one metric from an alternative representation of a database to create a request based on the at least one metric, invoking an interpreter associated with the database to return data related to the at least one metric, and displaying the data.

17 Claims, 4 Drawing Sheets

DISPLAYING METRICS FROM AN ALTERNATIVE REPRESENTATION OF A DATABASE

BACKGROUND

Some computer systems may be adapted to analyze data and generate reports based on the analyzed data. For example, a system may report profits by analyzing revenue and expenditures. A reporting application may be responsible for analyzing relevant data and generating the reports.

In many situations, the reports generated by such a system utilize data collected at multiple levels of the organization. Mappings (such as views), data structures, and complex queries may need to be generated and executed by the reporting application to relate and transform the data into user friendly information. Unfortunately, the performance of such systems may be adversely affected by the generation and execution of such mappings.

BRIEF SUMMARY

The problems noted above are solved in large part by a method and system for displaying metrics from an alternative representation of a database. One of the exemplary embodiments is a method that comprises selecting at least one metric from an alternative representation of a database to create a request based on the at least one metric, invoking an interpreter associated with the database to return data related to the at least one metric, and displaying the data.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. As used herein, the term "database" may comprise a set of data and an interpreter. The interpreter may be capable of processing queries to retrieve and store data to the set of data.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure, is limited to that embodiment.

Figure 1:
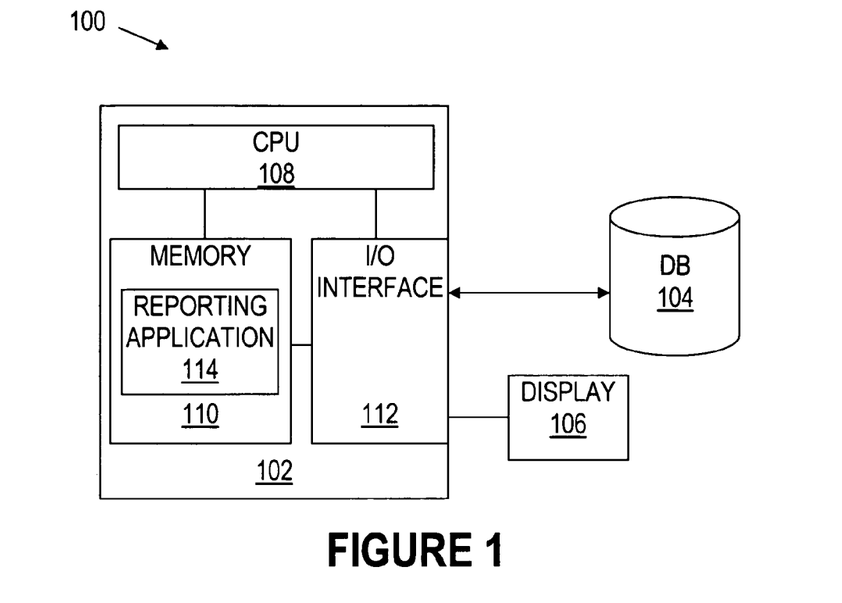
FIG. 1 shows a system constructed in accordance with embodiments of the invention and including a speech recognition module.

FIG. 1 shows a reporting system 100 configured in accordance with embodiments of the invention. As shown, system 100 comprises a computer system 102, a database 104, and a display 106. The database 104 may store various types of business data, such as supplier and customer information, pending orders, service level agreements (SLAs), and inventory. In some embodiments of the invention, the business data may be distributed in a plurality of databases.

The computer system 102 may be any type of computer system, such as a laptop computer, a personal computer, and/or a stand-alone computer operated as a server. The computer system 102 comprises a central processing unit (CPU) 108, a memory 110, and an input/output (I/O) interface 112. The memory 110 may comprise any type of volatile or non-volatile memory, such as random access memory (RAM), read-only memory (ROM), and a hard drive. Stored within the memory 110 are one or more reporting applications 114. The reporting application 114 may be a computer program designed to analyze the business data stored in database 104 and generate reports that are presented on the display 106.

A schema may organize existing business data in the database 104 and define relationships between the business data. For example, the schema may define tables, columns, and constraints for the business data stored in the database 104. In some embodiments, the database 104 may be a flat file or spreadsheet that stores the business data.

The I/O interface 112 couples together the database 104 with the computer system 102 and facilitates the exchange of data between the database 104 and the computer system 102. Although not specifically shown, the database 104 may be coupled to a network, such as the Internet, and the I/O interface may comprise a network adapter that facilitates the exchange of data between the database 104 and the network adapter.

The embodiments of the invention provide a framework for efficiently defining and computing business metrics from the database 104. As used herein, a business metric is a measurable property of elements associated with a business entity. The business entity may comprise any existing object defined by the schema of the database 104. For example, orders and customers, as well as related information, such as the order quantity and the products of an order, may be business entities. A metric associated with the business entities may represent the fulfillment or cost of a customer's orders. The metric may be quantitative, resulting in a numerical value, or qualitative, such as a taxonomy that places each element of an entity into groups.

Figure 2:
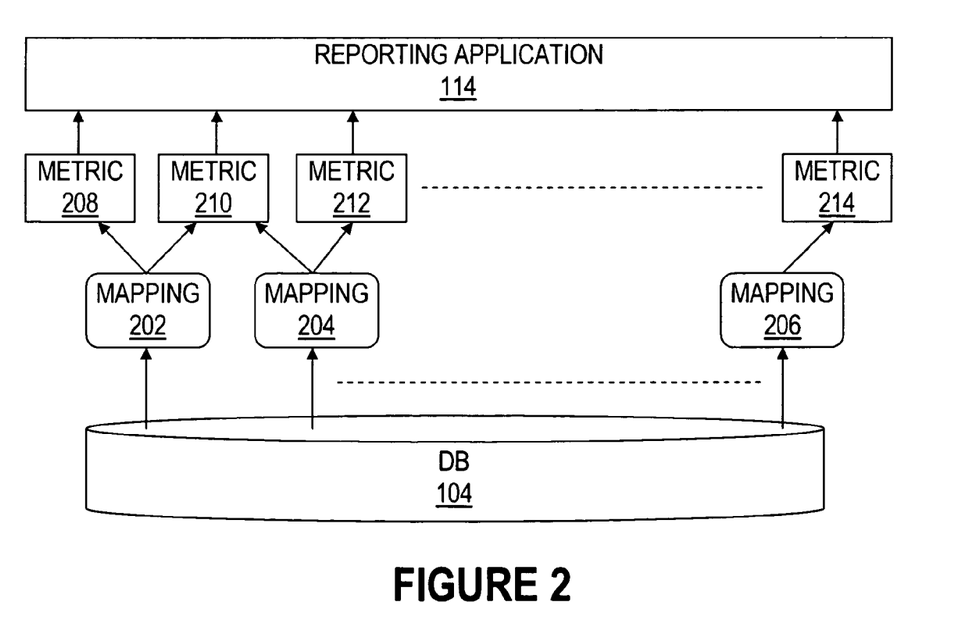
FIG. 2 shows a relationship between the reporting application and the database of FIG. 1.

FIG. 2 shows the relationship between the database 104 and the reporting application 114. As shown, one or more metrics 208-214 utilize data generated by one or more mappings 202-206. The mappings 202-206 may comprise computer readable code, such as structured query language (SQL)

and Java® classes, that interact with the underlying schema associated with the database 104 to compute the one or more metrics 208-214. The computer readable code may be executed by the interpreter of the database. The metrics 208-214 may provide meaning, or semantics, for the data mapped by the mappings 202-206. For example, a mapping may retrieve customers that have placed over ten orders in the last week from the database 104. A metric may utilize the results of this exemplary mapping to place each customer into a two-level taxonomy. The taxonomy may classify each customer as a high priority customer or a low priority customer based upon the results of the mapping. The reporting application 114 may utilize one or more metrics 208-214 that utilize the exemplary mapping to generate reports that are displayed on the display 106.

Figure 3:
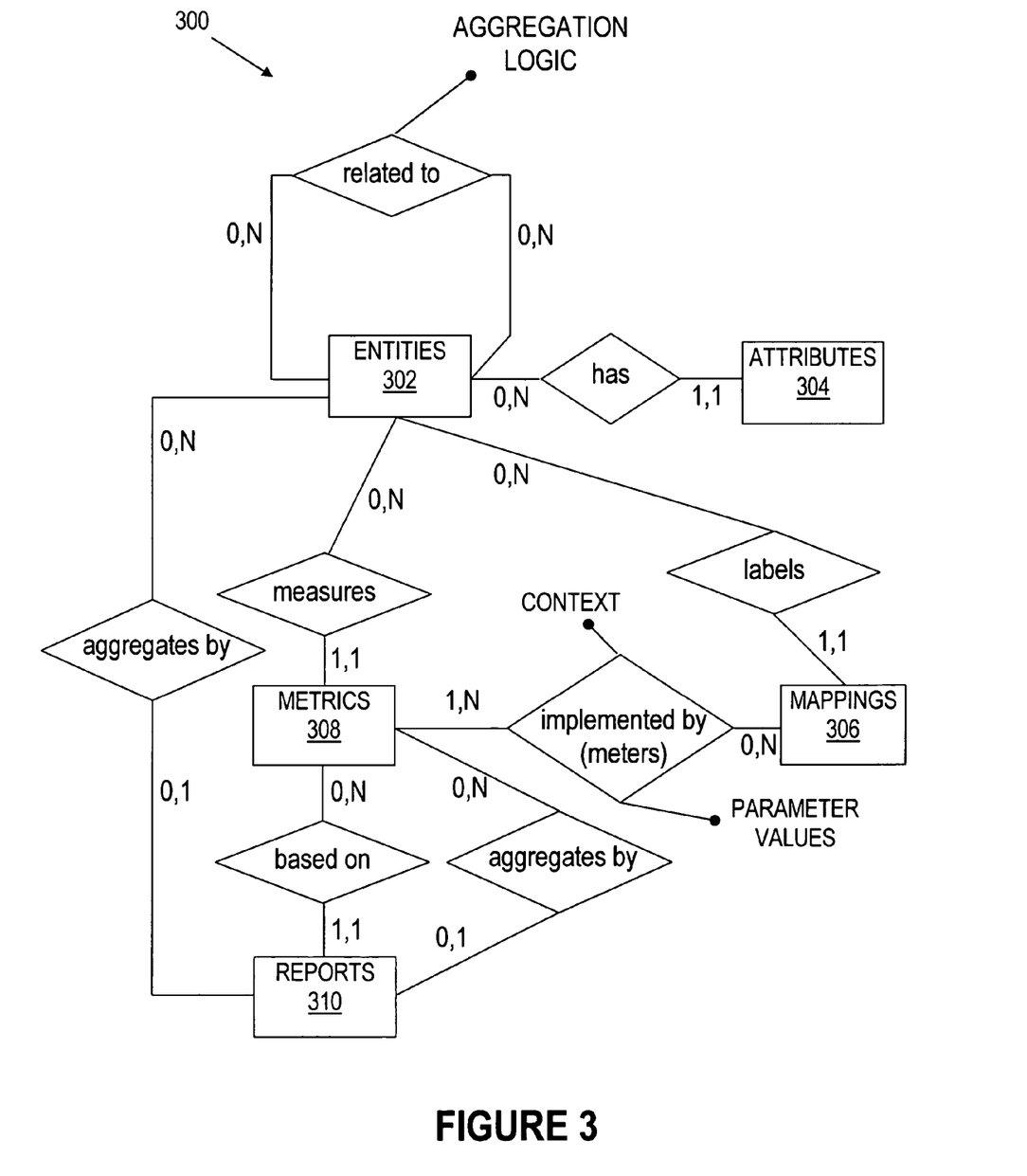
FIG. 3 illustrates an exemplary business data model in accordance with embodiments of the invention.

Referring now to FIG. 3, a business data model 300 is shown in accordance with at least some embodiments of the invention. As shown, the business data model 300 comprises an entities table 302, an attributes table 304, a mappings table 306, a metrics table 308, and a reports table 310. The cardinality of the relationships within the business data model 300 are shown. In accordance with embodiments of the invention, the business data model 300 acts as an abstraction layer between the database 104 and the reporting application 114. The abstraction layer provides an alternative representation of the database 104 to the reporting application 114. The business data model 300 may hold data concerning the existing schema of the database 114, as well as data concerning the metrics and reports of interest to a user of the reporting application 114. In addition, the business data model 300 may hold the mappings 202-206 used to compute the metrics 208-214 from the existing business data.

The business data model 300 may be incorporated into the existing schema of the database 104 or defined as a new schema in the database 114. Thus, after deployment of embodiments of the invention, the schema of the existing business data and a schema for the new business data model 300 may exist in the database 114. The business data model 300 includes a description of the existing business data and also describes how to map the existing business data into the metrics 208-214. The metrics 208-214 may be utilized to generate and display reports to a user of the reporting application 114.

Upon deployment of embodiments of the invention, a description of each existing business entity in the database 104 may be stored in the entities table 302. Table 1 illustrates an exemplary entities table 302 with exemplary data. As shown, the table comprises four columns: name, base_table, ID_column, and element_column. As with each table in the exemplary business model 300, other columns required by the database 104, such as a system assigned key, may also be used.

TABLE 1

ENTITIES

| ENTITY_NAME | BASE_TABLE | ID_COLUMN | ELEMENT_COLUMN |
|---|---|---|---|
| Orders | Orders_Received | Order_ID | Descriptive_Name |
| . | . | . | . |
| . | . | . | . |
| . | . | . | . |

The column entity_name may store a descriptive name for the entity, such as "Orders." The descriptive name may be utilized by the reporting application 114 when generating and displaying reports. The column base_table may store the name of the table in the existing schema of the database 104 that holds the data associated with the entity, such as "Orders_Received." The column ID_column may store the name of the column in the base_table that holds the key of the base_table, such as "Order_ID." The column element_column may store the column in the base_table that holds the name of the elements associated with the entity.

By accessing the entities table 302, the reporting application 114 may retrieve information associated with the business entities. In addition, the reporting application 114 may retrieve information regarding which tables in the existing schema store information about the business entities. Since the structure of the entities table 302 may be defined regardless of the entities being described, the reporting application 114 may be generic and independent from the specific business domain used to employ the embodiments of the invention.

Entities stored in the entities table 302 may have relationships with one or more other entities. Aggregation logic may define how aggregations may be performed on the relationships. For example, an orders entity may be related to a products entity. Aggregation logic may define how to group orders based on the product ordered. The aggregation logic may be implemented via any type of computer readable code supported by the database 104, such as SQL or Java® classes. The aggregation logic may be dependent only on the entities, and not on the metrics and reports defined over such entities. Hence, the aggregation logic used to aggregate orders based on the product is independent of the specific metrics defined over the orders entity. Once the aggregation logic for aggregating orders based on the product has been defined, it may also be possible to group any order-related metric (e.g., the order processing cost) by product entity (e.g., to retrieve the average processing cost by product). Thus, the aggregation logic is separate from any reporting logic utilized by the reporting application 114. This separation of logic enables the reuse of the aggregation logic for the generation of a multiplicity of reports defined on different metrics.

Table 2 illustrates an exemplary attributes table 304 with exemplary data. As shown, the table comprises four columns: entity_name, attribute_name, data_type, and attribute_column. Greater or fewer columns may be used depending upon the specific implementation chosen.

TABLE 2

ATTRIBUTES

| ENTITY_NAME | ATTRIBUTE_NAME | DATA_TYPE | ATTRIBUTE_COLUMN |
|---|---|---|---|
| Orders | Time_Placed | Date | Order_Date |
| . | . | . | . |
| . | . | . | . |
| . | . | . | . |

The column entity_name may store the related entity_name from the entities table 302. The column attribute_name may store a descriptive name of the attribute that may be utilized by the reporting application 114 when generating and displaying reports. The data_type may store the type of data associated with the attribute, such as a string, date, or integer. The attribute_column may store the name of the column in the base table of the existing business data associated with the entity that holds the attribute. The exemplary data in Table 2 may represent an attribute Time_Placed that represents the date an order was placed. The combination of the entitles table 302 and attributes table 304 may be utilized with a variety of business domains to describe the associated business data.

Table 3 illustrates an exemplary mappings table 306 and exemplary data. As shown, the table comprises four columns: mapping_name, data_type, mapped_entity, and mapping_function. Greater or fewer columns may be used depending upon the specific implementation chosen. The mappings table 306 may also comprise one or more columns that store the name and type of any mapping_function parameters.

TABLE 3

MAPPINGS

| MAPPING_NAME | DATA_TYPE | MAPPED_ENTITY | MAPPING_FUNCTION |
|---|---|---|---|
| Total_Cost | Integer | Customer_ | Select . . . From . . . |
| . | . | . | . |
| . | . | . | . |
| . | . | . | . |

The column mapping_name stores a descriptive name of the mapping that may be displayed to user of the system 100 by the reporting application 114, such as "Total Cost." The column data type stores the type of data returned by the mapping_function, such as "Integer." The column mapped_entity stores the name of the entity to which the mapping function is applied. In the example above, the mapping computes the total cost for each customer. The column mapping_fuction stores the function that computes values from the existing business data in the database 104. The semantics to these values may be defined by the metrics, as discussed below. The mapping function may be implemented as any type of compute readable code, such as SQL queries and Java® classes.

Table 4 illustrates an exemplary metrics table 308. As shown, the table comprises three columns: metric_name, data_type, and metric_entity. Greater or fewer columns may be used depending upon the specific implementation chosen.

TABLE 4

METRICS

| METRIC_NAME | DATA_TYPE | METRIC_ENTITY |
|---|---|---|
| Preferred_Customer | Boolean | Customers |
| . | . | . |
| . | . | . |
| . | . | . |

The column metic_name stores a descriptive name of the metric being computed, in this example "Preferred_Customer." The column data_type stores the type of data the associated with the metric, such as "Boolean" (a special case of taxonomical metric in which the classes are TRUE or FALSE). The column metric_entity stores the name of the entity whose elements are measured by the metric, such as "Customers." The example metric in Table 4 may represent a taxonomy that portrays if a customer is "preferred." The preferred status may be assigned to customers who spend a threshold amount or placed a threshold number of orders.

Some embodiments of the invention allow the association of metrics with mappings. This association denotes that a particular mapping function may be used to compute a particular metric. A separate table, called meters, may be defined in the business data model 300 to store this association. Table 5 illustrates an exemplary meters table with associated data.

TABLE 5

METERS

| METRIC | MAPPING | CONTEXT |
|---|---|---|
| Preferred_Customer | cost_less_than | Customer_XYZ |
| . | . | . |
| . | . | . |
| . | . | . |

The exemplary data is associated with the metric preferred_ customer. The metric may be computed by running function cost_less_than (that defines whether the cost for processing customers order is less than a certain amount). However, the function may only be executed for a specific a customer name customer_XYZ. The amount associated with the metric may be a parameter of the mapping function. Any parameters of the mapping function may be stored in a separate column (not specifically shown) of the meters table.

The reports 310 table may store reports generated by the reporting application 114. The reporting application 114 utilizes, at least in part, the metrics defined in the metrics table 308 to generate the reports displayed on the display 106.

In at least some embodiments, the mappings 202-206 are defined by SQL queries. The following SQL query is a (Boolean) mapping function that runs over the existing business data in the database 104 and returns <quote request identifiers, value> pairs, where the value corresponds to the time taken by the hub to respond to the request for quote.

SELECT QUOTE_UUID, DURATION
FROM QUOTE_REQUESTS Q

The next exemplary mapping function is a Boolean mapping that returns all orders processed in a time that exceeded a time specified as part of the service level agreement stipulated with a customer. The value associated with this exemplary mapping may be understood to be TRUE.

SELECT QUOTE_UUID
FROM QUOTE_REQUESTS Q, SLA, CUSTOMER C
WHERE Q.CUSTOMER_ID=C.ID AND
LA.CUSTOMER_ID=C.ID AND
Q.DURATION>SLA.MAX_DURATION

In some embodiments of the invention, mapping functions may return more than <element ID, value> pairs. For example, elements being analyzed may frequently be associated with a start and an end time. A timestamp may be generated by the database 104 to obtain the start and end time value.

A more complex example of a mapping function utilizing parameters and a timestamp is shown below. The exemplary mapping function associates each quote request with the value of one of its attributes, whose name is a parameter of the mapping. The mapping parameter is enclosed between percentage symbols. The mapping parameter may be replaced with code that retrieves the actual parameters, as previously discussed, when associated with one or more meters.

SELECT Q.QUOTE_UUID,QD.VALUE, Q.TIMESTAMP
FROM QUOTE_REQUESTS Q,
QUOTE_DATA QD, QUOTE_DATA_DEFS QDD
WHERE QDD.NAME=%NAME%
AND QDD.ID=QD.DATA_DEF_ID AND
QD.QUOTE_UUID=Q.QUOTE_UUID

One or more metrics may refer to the same mapping, possibly applied to different contexts (e.g., the notion of preferred customer may be computed using different functions based on the customer type) and using different parameters. This enables mapping function code to be reused by several metrics.

Figure 4:
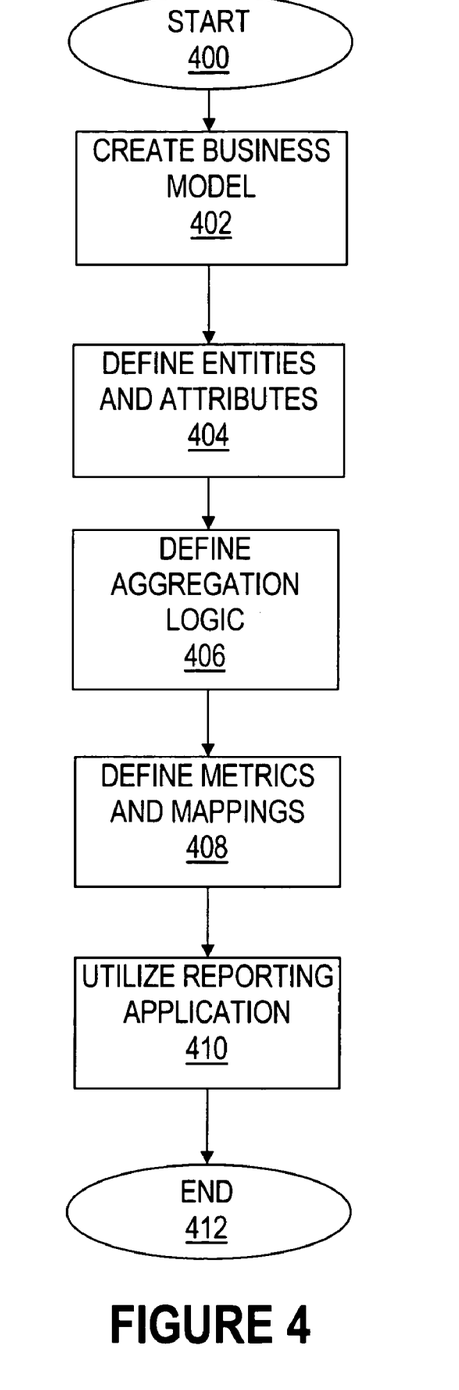
FIG. 4 illustrates an exemplary deployment procedure in accordance with embodiments of the invention.

Referring now to FIG. 4, an exemplary deployment procedure is show in accordance with embodiments of the invention. As shown, the procedure begins (block 400) and steps to creating the business data model 300 based on the existing business data in database 114 (block 402). After the data model 300 has been created, entities (and attributes associated with the entities) may be defined and stored into the entities table 302 and the attribute table 304 of the data model 300 (block 404). Aggregation logic associated with the defined entities may be defined and stored for relationships between the entities (block 406). Metrics and mapping then may be defined and stored in the metrics table 308 and the mappings table 306, as well as in the meters table (block 408). As previously discussed, each mapping may be associated with an SQL function or statement that maps data from the existing schema for use with the metrics 208-214. The reporting application 114 may be utilized to generate one or more reports (block 410), thereby ending the procedure (block 412).

Figure 5:
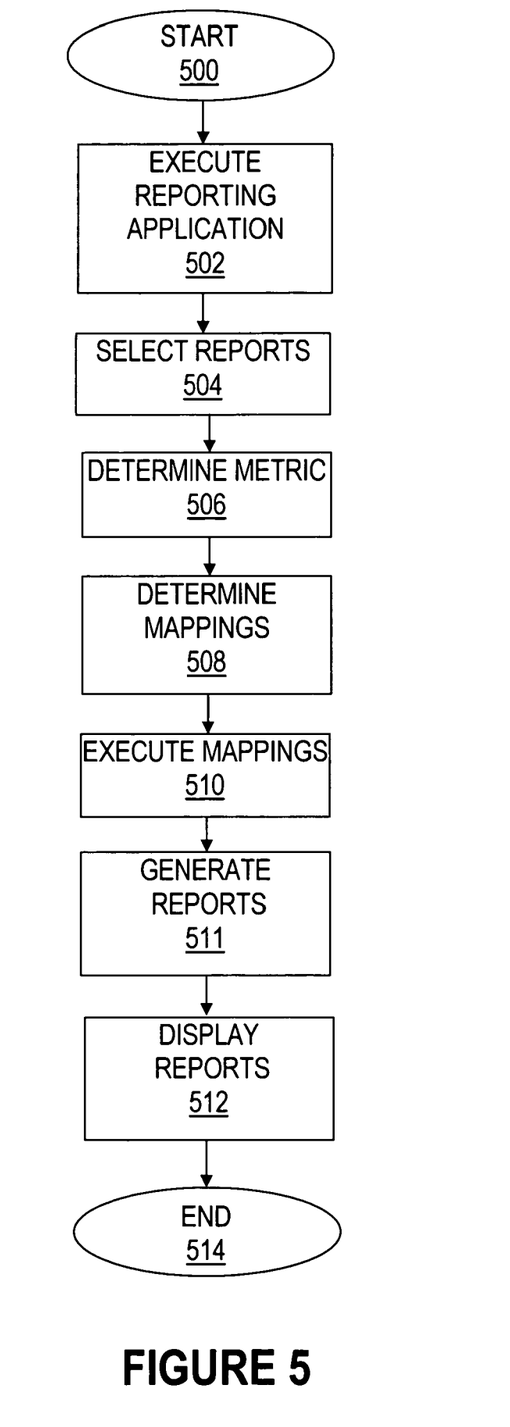
FIG. 5 illustrates an exemplary report generation procedure in accordance with embodiments of the invention.

FIG. 5 shows an exemplary report generation procedure in accordance with embodiments of the invention. As shown, the procedure begins (block 500) and then proceeds to the execution of the reporting application 114 (block 502). Reports may be selected via the reporting application 114 (block 504) based on input from a user of the reporting application 114. The reporting application 114 may determine which metrics the report is based (block 506). After determination of the metrics, the corresponding mappings may be determined by accessing the meters table (block 508). The determined mappings may then be executed by the database interpreter (block 510). The generation of a report may involve formatting the data received into a visual format, such as graphs and tables, and also may involve associated processing by the reporting application 114 (block 511). For example, the data received from block 508 may be rounded by the reporting application based on a preference of the user. After generation, the report may be displayed on the display 106 (block 512), and the procedure may end (block 514). As can be appreciated, the foregoing procedure may be performed in fewer or more steps and may be performed in a different order than the one provided.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor-based method comprising:
   selecting, by a user, at least one metric from an alternative representation of a database of existing data;
   invoking a mapping associated with the at least one metric to create a search query;
   invoking an interpreter to execute the search query and return data related to the search query; and
   displaying the data related to the search query;
   generating a request based on the existing data from the request based on the at least one metric prior to the invoking; and
   wherein the invoking further comprises invoking the interpreter using the request based on the at least one metric.

2. The method as defined in claim 1 wherein selecting further comprises selecting from the alternative representation of the database wherein the alternative representation is a reduced version of the existing data.

3. The method as defined in claim 1 wherein selecting further comprises selecting a metric.

4. The method as defined in claim 1 wherein selecting further comprises selecting the at least one metric from the alternative representation of the database of existing data to create a generic structured query language (SQL) request based on the at least one metric.

5. The method as defined in claim 4 wherein generating further comprises generating a specialized SQL request based on the existing data from the request based on the at least one metric.

6. The method as defined in claim 1 wherein the selecting further comprises selecting at least one metric from the alternative representation of the database of existing data, the alternative representation incorporated with the existing data in the database.

7. A computer readable medium storing a program that, when executed by a processor of a computer, performs a method comprising:
   maintaining existing data;
   storing metrics related to the existing data;
   mapping the existing data to the metrics; and
   providing access to the existing data by referencing the metrics;
   wherein the reporting program allows a user to select at least one metric from an alternative representation of a database to create a request based on the at least one metric, and wherein an interpreter of the database modifies the request to pertain to the previously created data.

8. The computer readable medium as defined in claim 7 wherein mapping further comprises mapping the existing data to a set of predefined metrics.

9. The computer readable medium as defined in claim 8 wherein mapping further comprises utilizing a general mapping table to related the existing data to the predetermined metrics.

10. The computer readable medium as defined in claim 7 wherein the providing further comprises generating a specific query to the existing data using the metrics.

11. A system comprising:
    a computer system having
       a central processing unit (CPU);
       a memory coupled to the CPU, the memory storing a reporting application executable by the CPU;
       a database coupled to the computer system, the database storing a previously created data set;
       wherein the database comprises an alternative representation of the previously created data and an interpreter that executes search queries generated from mappings stored in the alternative representation;
       wherein the reporting program allows a user to select at least one metric from the alternative representation of the database to create a request based on the at least one metric, and wherein an interpreter of the database modifies the request to pertain to the previously created data.

12. The system as defined in claim 11 wherein the database is part of the computer system.

13. The system as defined in claim 11 further comprising allowing the user to select a metric in a generalized model.

14. The system as defined in claim 11 wherein the reporting program allows a user to select at least one metric from the alternative representation of the database to create structured query language (SQL) request based on the at least one metric, and wherein an interpreter of the database replaces labels of the SQL request to pertain to the previously created data.

15. The system as defined in claim 11 wherein the database comprises a reduced representation as the alternative representation.

16. A system comprising:
a computer system having
a means for executing programs;
a means for storing programs coupled to the means for executing, the means for storing a reporting application executable by the means for executing;
a database coupled to the computer system, the database storing a previously created data set;
wherein the database comprises an alternative representation of the previously created data and an interpreter that executes search queries generated from mappings stored in the alternative representation;
wherein the reporting program allows a user to select at least one metric from the alternative representation of the database to create a request based on the at least one metric, and wherein an interpreter of the database modifies the request to pertain to the previously created data.

17. The system as defined in claim 16 further comprising allowing the user to select a metric.

* * * * *

UNITED STATES PATENT AND TRADEMARK OFFICE
CERTIFICATE OF CORRECTION

| | | |
|---|---|---|
| PATENT NO. | : 7,505,967 B2 | |
| APPLICATION NO. | : 10/761642 | |
| DATED | : March 17, 2009 | |
| INVENTOR(S) | : Fabio Casati et al. | |

It is certified that error appears in the above-identified patent and that said Letters Patent is hereby corrected as shown below:

In column 8, line 37, in Claim 9, delete "predetermined" and insert -- predefined --, therefor.

Signed and Sealed this

Thirteenth Day of April, 2010

David J. Kappos
*Director of the United States Patent and Trademark Office*